US010500600B2

(12) United States Patent
Henry, Jr. et al.

(10) Patent No.: US 10,500,600 B2
(45) Date of Patent: Dec. 10, 2019

(54) GESTURE RECOGNITION USER INTERFACE FOR AN AEROSOL DELIVERY DEVICE

(71) Applicant: R.J. Reynolds Tobacco Company, Winston-Salem, NC (US)

(72) Inventors: Raymond Charles Henry, Jr., Cary, NC (US); Wilson Christopher Lamb, Hillsborough, NC (US); Mark Randall Stone, Raleigh, NC (US); Glen Joseph Kimsey, Cary, NC (US); Frederic Philippe Ampolini, Winston-Salem, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 308 days.

(21) Appl. No.: 14/565,137

(22) Filed: Dec. 9, 2014

(65) Prior Publication Data

US 2016/0158782 A1 Jun. 9, 2016

(51) Int. Cl.

| | |
|---|---|
| ***A24F 47/00*** | (2006.01) |
| ***B05B 12/08*** | (2006.01) |
| ***G05B 15/02*** | (2006.01) |
| ***F22B 1/28*** | (2006.01) |

(52) U.S. Cl.
CPC ............ *B05B 12/08* (2013.01); *A24F 47/008* (2013.01); *F22B 1/284* (2013.01); *G05B 15/02* (2013.01)

(58) Field of Classification Search
CPC ...................................................... A24F 47/008
See application file for complete search history.

(56) References Cited

U.S. PATENT DOCUMENTS

| | | | |
|---|---|---|---|
| 1,771,366 | A | 7/1930 | Wyss et al. |
| 2,057,353 | A | 10/1936 | Whittemore, Jr. |
| 2,104,266 | A | 1/1938 | McCormick |
| 3,200,819 | A | 8/1965 | Gilbert |

(Continued)

FOREIGN PATENT DOCUMENTS

| | | |
|---|---|---|
| AU | 276250 | 7/1965 |
| CA | 2 641 869 | 5/2010 |

(Continued)

OTHER PUBLICATIONS

Akl, Ahmad, "A Novel Accelerometer-Based Gesture Recognition System," Thesis, Graduate Department of Electrical and Computer Engineering, University of Toronto, 2010, pp. 1-73.

(Continued)

*Primary Examiner* — Eric Yaary
(74) *Attorney, Agent, or Firm* — Womble Bond Dickinson (US) LLP

(57) ABSTRACT

An aerosol delivery device is provided that includes a housing, motion sensor and microprocessor. The motion sensor is within the housing and configured to detect a defined motion of the aerosol delivery device caused by user interaction with the housing to perform a gesture. The motion sensor may be configured to convert the defined motion to an electrical signal. The microprocessor or motion sensor, then, may be configured to receive the electrical signal, recognize the gesture and an operation associated with the gesture based on the electrical signal, and control at least one functional element of the aerosol delivery device to perform the operation.

22 Claims, 6 Drawing Sheets

(56) References Cited

Figure 1:
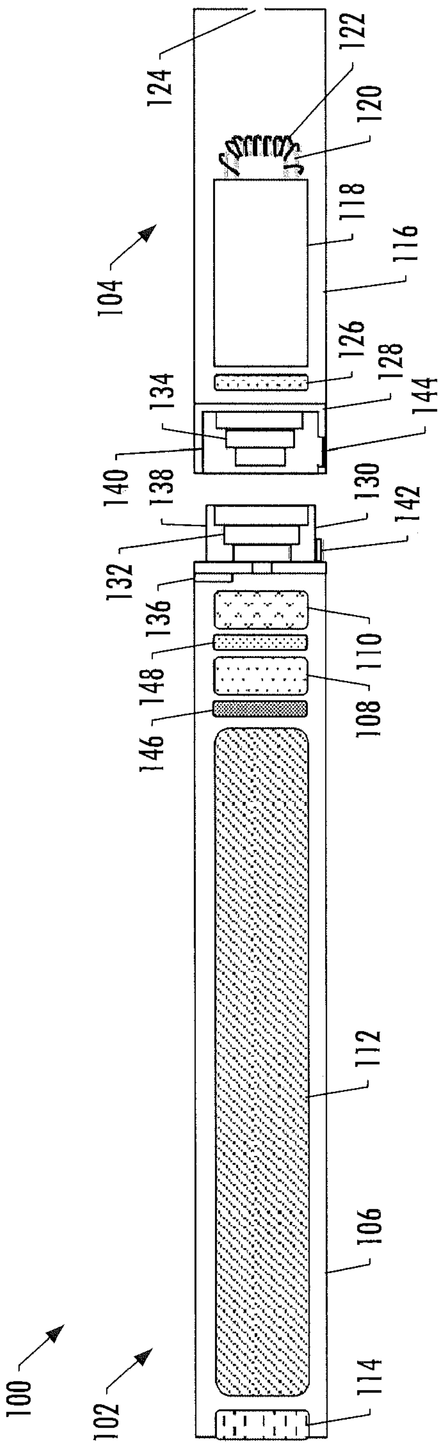

U.S. PATENT DOCUMENTS 4,284,089 A 8/1981 Ray
4,303,083 A 12/1981 Burruss, Jr.
4,735,217 A 4/1988 Gerth et al.
4,848,374 A 7/1989 Chard et al.
4,907,606 A 3/1990 Lilja et al.
4,922,901 A 5/1990 Brooks et al.
4,945,931 A 8/1990 Gori
4,947,874 A 8/1990 Brooks et al.
4,947,875 A 8/1990 Brooks et al.
4,986,286 A 1/1991 Roberts et al.
5,019,122 A 5/1991 Clearman et al.
5,042,510 A 8/1991 Curtiss et al.
5,060,671 A 10/1991 Counts et al.
5,093,894 A 3/1992 Deevi et al.
5,144,962 A 9/1992 Counts et al.
5,249,586 A 10/1993 Morgan et al.
5,261,424 A 11/1993 Sprinkel, Jr.
5,322,075 A 6/1994 Deevi et al.
5,353,813 A 10/1994 Deevi et al.
5,369,723 A 11/1994 Counts et al.
5,372,148 A 12/1994 McCafferty et al.
5,388,574 A 2/1995 Ingebrethsen et al.
5,408,574 A 4/1995 Deevi et al.
5,468,936 A 11/1995 Deevi et al.
5,498,850 A 3/1996 Das
5,515,842 A 5/1996 Ramseyer et al.
5,530,225 A 6/1996 Hajaligol
5,564,442 A 10/1996 MacDonald et al.
5,649,554 A 7/1997 Sprinkel et al.
5,666,977 A 9/1997 Higgins et al.
5,687,746 A 11/1997 Rose et al.
5,726,421 A 3/1998 Fleischhauer et al.
5,727,571 A 3/1998 Meiring et al.
5,799,663 A 9/1998 Gross et al.
5,819,756 A 10/1998 Mielordt
5,865,185 A 2/1999 Collins et al.
5,865,186 A 2/1999 Volsey, II
5,878,752 A 3/1999 Adams et al.
5,894,841 A 4/1999 Voges
5,934,289 A 8/1999 Watkins et al.
5,954,979 A 9/1999 Counts et al.
5,967,148 A 10/1999 Harris et al.
6,040,560 A 3/2000 Fleischhauer et al.
6,053,176 A 4/2000 Adams et al.
6,089,857 A 7/2000 Matsuura et al.
6,095,153 A 8/2000 Kessler et al.
6,125,853 A 10/2000 Susa et al.
6,155,268 A 12/2000 Takeuchi
6,164,287 A 12/2000 White
6,196,218 B1 3/2001 Voges
6,196,219 B1 3/2001 Hess et al.
6,598,507 B1 7/2003 Adiga et al.
6,601,776 B1 8/2003 Oljaca et al.
6,615,840 B1 9/2003 Fournier et al.
6,688,313 B2 2/2004 Wrenn et al.
6,772,756 B2 8/2004 Shayan
6,803,545 B2 10/2004 Blake et al.
6,854,461 B2 2/2005 Nichols
6,854,470 B1 2/2005 Pu
7,117,867 B2 10/2006 Cox et al.
7,293,565 B2 11/2007 Griffin et al.
7,513,253 B2 4/2009 Kobayashi et al.
7,775,459 B2 8/2010 Martens, III et al.
7,832,410 B2 11/2010 Hon
7,845,359 B2 12/2010 Montaser
7,896,006 B2 3/2011 Hamano et al.
8,127,772 B2 3/2012 Montaser
8,314,591 B2 11/2012 Terry et al.
8,365,742 B2 2/2013 Hon
8,402,976 B2 3/2013 Fernando et al.
8,499,766 B1 8/2013 Newton
8,528,569 B1 9/2013 Newton
8,550,069 B2 10/2013 Alelov
2002/0146242 A1 10/2002 Vieira
2003/0226837 A1 12/2003 Blake et al.
2004/0118401 A1 6/2004 Smith et al.
2004/0129280 A1 7/2004 Woodson et al.
2004/0200488 A1 10/2004 Felter et al.
2004/0226568 A1 11/2004 Takeuchi et al.
2005/0016550 A1 1/2005 Katase
2006/0016453 A1 1/2006 Kim
2006/0196518 A1 9/2006 Hon
2007/0074734 A1 4/2007 Braunshteyn et al.
2007/0102013 A1 5/2007 Adams et al.
2007/0215167 A1 9/2007 Crooks et al.
2008/0085103 A1 4/2008 Beland et al.
2008/0092912 A1 4/2008 Robinson et al.
2008/0257367 A1 10/2008 Paterno et al.
2008/0276947 A1 11/2008 Martzel
2008/0302374 A1 12/2008 Wengert et al.
2009/0095311 A1 4/2009 Hon
2009/0095312 A1 4/2009 Herbrich et al.
2009/0126745 A1 5/2009 Hon
2009/0188490 A1 7/2009 Hon
2009/0230117 A1 9/2009 Fernando et al.
2009/0265671 A1* 10/2009 Sachs ...................... G06F 3/017
715/863
2009/0272379 A1 11/2009 Thorens et al.
2009/0283103 A1 11/2009 Nielsen et al.
2009/0320863 A1 12/2009 Fernando et al.
2010/0043809 A1 2/2010 Magnon
2010/0083959 A1 4/2010 Siller
2010/0117959 A1* 5/2010 Hong .................... G06F 1/1626
345/158
2010/0200006 A1 8/2010 Robinson et al.
2010/0229881 A1 9/2010 Hearn
2010/0242974 A1 9/2010 Pan
2010/0307518 A1 12/2010 Wang
2010/0313901 A1 12/2010 Fernando et al.
2011/0005535 A1 1/2011 Xiu
2011/0011396 A1 1/2011 Fang
2011/0036346 A1* 2/2011 Cohen ............... A61M 15/0065
128/200.14
2011/0036363 A1 2/2011 Urtsev et al.
2011/0036365 A1 2/2011 Chong et al.
2011/0094523 A1 4/2011 Thorens et al.
2011/0126848 A1 6/2011 Zuber et al.
2011/0155153 A1 6/2011 Thorens et al.
2011/0155718 A1 6/2011 Greim et al.
2011/0163955 A1* 7/2011 Nasiri ..................... A63F 13/06
345/158
2011/0168194 A1 7/2011 Hon
2011/0265806 A1 11/2011 Alarcon et al.
2011/0309157 A1 12/2011 Yang et al.
2012/0042885 A1 2/2012 Stone et al.
2012/0060853 A1 3/2012 Robinson et al.
2012/0111347 A1 5/2012 Hon
2012/0132643 A1 5/2012 Choi et al.
2012/0227752 A1 9/2012 Alelov
2012/0231464 A1 9/2012 Yu et al.
2012/0260927 A1 10/2012 Liu
2012/0279512 A1 11/2012 Hon
2012/0318882 A1 12/2012 Abehasera
2013/0037041 A1 2/2013 Worm et al.
2013/0042865 A1* 2/2013 Monsees ............... A61M 15/06
128/203.27
2013/0056013 A1 3/2013 Terry et al.
2013/0081625 A1 4/2013 Rustad et al.
2013/0081642 A1 4/2013 Safari
2013/0133427 A1* 5/2013 Yudovsky ........... G01P 15/0802
73/514.34
2013/0192619 A1 8/2013 Tucker et al.
2013/0306084 A1 11/2013 Flick
2013/0319439 A1 12/2013 Gorelick et al.
2013/0340750 A1 12/2013 Thorens et al.
2013/0340775 A1 12/2013 Juster et al.
2014/0060554 A1 3/2014 Collett et al.
2014/0060555 A1 3/2014 Chang et al.
2014/0096781 A1 4/2014 Sears et al.
2014/0096782 A1 4/2014 Ampolini et al.
2014/0107815 A1* 4/2014 LaMothe ................ A24F 15/18
700/90

(56) References Cited

U.S. PATENT DOCUMENTS

| | | | | |
|---|---|---|---|---|
| 2015/0173419 A1* | 6/2015 | Tu | A24F 47/008 131/329 |
| 2015/0245654 A1* | 9/2015 | Memari | A24F 15/12 141/2 |
| 2016/0053988 A1* | 2/2016 | Quintana | A24F 47/008 392/397 |

FOREIGN PATENT DOCUMENTS

| | | |
|---|---|---|
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 316 286 | 5/2011 |
| GB | 2469850 | 11/2010 |
| WO | WO 1997/48293 | 12/1997 |
| WO | WO 2004/043175 | 5/2004 |
| WO | WO 2004/080216 | 9/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/118644 | 10/2010 |
| WO | WO 2010/140937 | 12/2010 |
| WO | WO 2011/010334 | 1/2011 |
| WO | WO 2012/072762 | 6/2012 |
| WO | WO 2012/100523 | 8/2012 |
| WO | 2013/020220 | 2/2013 |
| WO | WO 2013/089551 | 6/2013 |
| WO | WO 2014/150247 | 9/2014 |

OTHER PUBLICATIONS

Analog Devices, "Small, Lower Power, 3-Axis ±3 g Accelerometer," 2010, pp. 1-16.

Andrejašič, Matej, "Mems Accelerometers," Seminar, University of Ljubjana, Faculty for Mathematics and Physics, Department of Physics, 2008, pp. 1-17.

Ezhilvendan et al. "Motion Controlled Password Recognition System Using MEMS Accelerometer," *IJCSMR*, vol. 2, Issue 2, 2013.

Franz, Olivia, "Tilt Sensor" (visited Dec. 8, 2014) <http://www.openobject.org/physicalprogramming/images/e/eb/S3167443_Tilt_Sensor_Report.pdf>.

Freescale Semiconductor, "3-Axis Orientation/Motion Detection Ssensor," Document No. MMA7660FC, 2009-2012, pp. 1-34.

Freescale Semiconductor, "Xtrinsic MMA8652FC 3-Axis, 12-bit Digital Accelerometer," Document No. MMA8652FC, 2012-2013, pp. 1-63.

Liu et al., "uWave: Accelerometer-based Personalized Gesture Recognition and Its Applications," Department of Electrical Computer Engineering, Rice University, Houston, TX, pp. 1-9.

wikipedia.org, "Gesture Recognition" (last modified Jul. 30, 2014) <http://en.wikipedia.org/wiki/Gesture_recognition>.

wikipedia.org, "Pattern Recognition" (last modified Nov. 17, 2014) <http://en.wikipedia.org/wiki/Pattern_recognition>.

Wu et al., "Hand Motion-Based Remote Control Interface with Vibrotactile Feedback for Home Robots", *Int. J. Adv. Robotic Sy.*, 2013, vol. 10, No. 270, pp. 1-10.

Xie et al., "Integrated Microelectromechanical Gyroscopes," *Journal of Aerospace Engineering*, 2003, pp. 65-75.

Xu et al., "MEMS Accelerometer Based Nonspecific-User Hand Gesture Recognition," *IEEE Sensors Journal*, vol. 12, No. 5, May 2012, pp. 1166-1173.

Zhang et al., "Self-Defined Gesture Recognition on Keyless Handheld Devices using MEMS 3D Accelerometer", *IEEE Computer Society*, 2008, pp. 237-241.

Zhou et al., "Gesture Recognition for Interactive Controllers Using MEMS Motion Sensors", Proceedings of the 2009 4$^{th}$ IEEE International Conference on Nano/Micro Engineered and Molecular Systems, Jan. 5-8, 2009, Shenzhen, China, pp. 935-940.

International Search Report dated Feb. 29, 2016 for Application No. PCT/US2015063929.

* cited by examiner

```
                 ┌─────────┐
                 │   800
                 └────┬────┘
                      ▼
        ┌───────────────────────────────┐
        │ DETECT DEFINED MOTION OF AEROSOL│
   802 ─┤ DELIVERY DEVICE AND CONVERT TO │
        │       ELECTRICAL SIGNAL        │
        └───────────────┬───────────────┘
                        ▼
        ┌───────────────────────────────┐
        │      RECOGNIZE GESTURE AND     │
   804 ─┤  ASSOCIATED OPERATION BASED ON │
        │        ELECTRICAL SIGNAL       │
        └───────────────┬───────────────┘
                        ▼
        ┌───────────────────────────────┐
        │ CONTROL FUNCTIONAL ELEMENT(S) OF│
   806 ─┤   AEROSOL DELIVERY DEVICE TO   │
        │       PERFORM THE OPERATION    │
        └───────────────┬───────────────┘
                        ▼
                 ┌─────────┐
                 └─────────┘
```

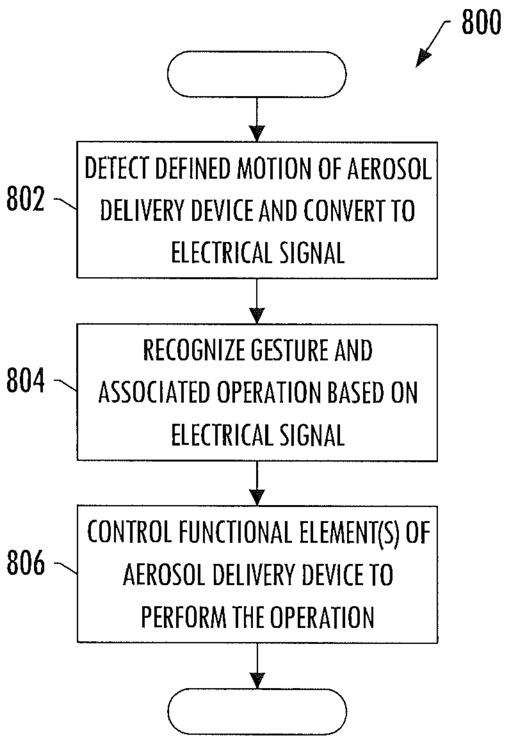

FIG. 8

GESTURE RECOGNITION USER INTERFACE FOR AN AEROSOL DELIVERY DEVICE

TECHNOLOGICAL FIELD

The present disclosure relates to aerosol delivery devices such as smoking articles, and more particularly to aerosol delivery devices that may utilize electrically generated heat for the production of aerosol (e.g., smoking articles commonly referred to as electronic cigarettes). The smoking articles may be configured to heat an aerosol precursor, which may incorporate materials that may be made or derived from, or otherwise incorporate tobacco, the precursor being capable of forming an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 7,726,320 to Robinson et al., U.S. Pat. App. Pub. No. 2013/0255702 to Griffith Jr. et al., and U.S. Pat. App. Pub. No. 2014/0096781 to Sears et al., all of which are incorporated herein by reference in their entireties. See also, for example, the various types of smoking articles, aerosol delivery devices and electrically-powered heat generating sources referenced by brand name and commercial source in U.S. patent application Ser. No. 14/170,838 to Bless et al., filed Feb. 3, 2014, which is incorporated herein by reference in its entirety.

It would be desirable to provide a smoking article that employs heat produced by electrical energy to provide the sensations of cigarette, cigar, or pipe smoking, that does so without combusting or pyrolyzing tobacco to any significant degree, that does so without the need of a combustion heat source, and that does so without necessarily delivering considerable quantities of incomplete combustion and pyrolysis products. Further, advances with respect to manufacturing electronic smoking articles would be desirable.

BRIEF SUMMARY

The present disclosure relates to aerosol delivery devices, methods of forming such devices, and elements of such devices. According to one aspect of example implementations of the present disclosure, an aerosol delivery device is provided. The aerosol delivery device includes a housing, motion sensor and microprocessor. In some examples, the motion sensor includes a tilt sensor, microelectromechanical systems-based (MEMS-based) accelerometer, MEMS-based gyroscope or a combination of one or more thereof. The motion sensor is within the housing and configured to detect a defined motion of the aerosol delivery device caused by user interaction with the housing to perform a gesture, such as to trace a character with the housing. The motion sensor may be configured to convert the defined motion to an electrical signal.

The microprocessor or motion sensor may be configured to receive the electrical signal, recognize the gesture and an operation associated with the gesture based on the electrical signal, and control at least one functional element of the aerosol delivery device to perform the operation. In some examples, the electrical signal conveys data about the defined motion of the aerosol delivery device. In these examples, the microprocessor may be configured to recognize the gesture, including the microprocessor being configured to recognize a pattern in the data, the pattern being associated with the gesture. And in some further examples, the pattern is one of a plurality of patterns associated with a respective plurality of gestures associated with a respective plurality of operations.

In some examples, the gesture may be user-defined. In these examples, the microprocessor may be configured to recognize the gesture. And beforehand, the microprocessor is configured to receive user selection of the operation and learn to recognize the gesture with which the operation is associated based on training data conveyed by another electrical signal from the motion sensor, the other electrical signal being converted from a training motion that is the same as or substantially similar to the defined motion.

In some examples, the operation may include altering a power state of the aerosol delivery device, or altering a locked state of the aerosol delivery device.

In some examples, the microprocessor may be configured to control at least one functional element of the aerosol delivery device to perform the operation, including the microprocessor being configured to control a sensory-feedback member to provide an indication of a charge-level of a battery configured to supply power to the aerosol delivery device.

In some examples, the microprocessor may be configured to control at least one functional element of the aerosol delivery device to perform the operation, including the microprocessor being configured to control a sensory-feedback member to provide an indication of a level of an aerosol precursor composition retained in a reservoir of the aerosol delivery device.

In another aspect of example implementations, a method is provided for controlling operation of an aerosol delivery device including a motion sensor within a housing thereof, and including a microprocessor. The features, functions and advantages discussed herein may be achieved independently in various example implementations or may be combined in yet other example implementations further details of which may be seen with reference to the following description and drawings.

BRIEF DESCRIPTION OF THE DRAWING(S)

Figure 2:
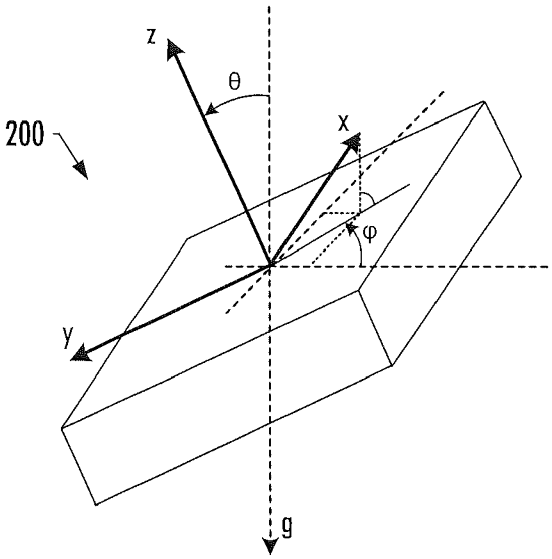
Figure 3:
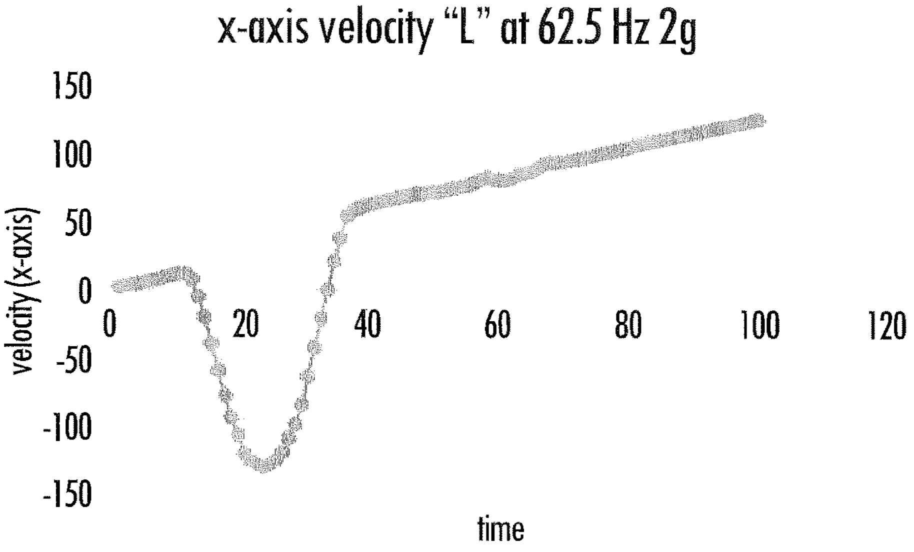
Figure 4:
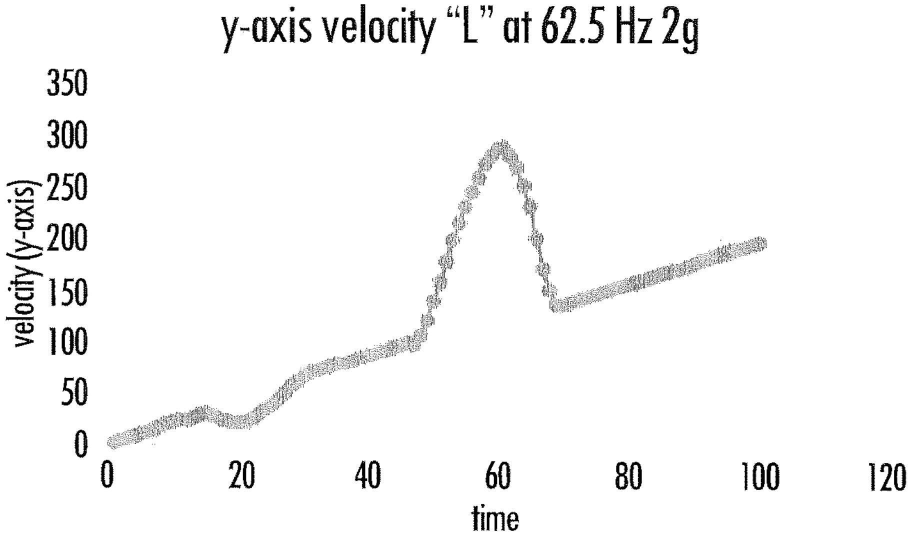
Figure 5:
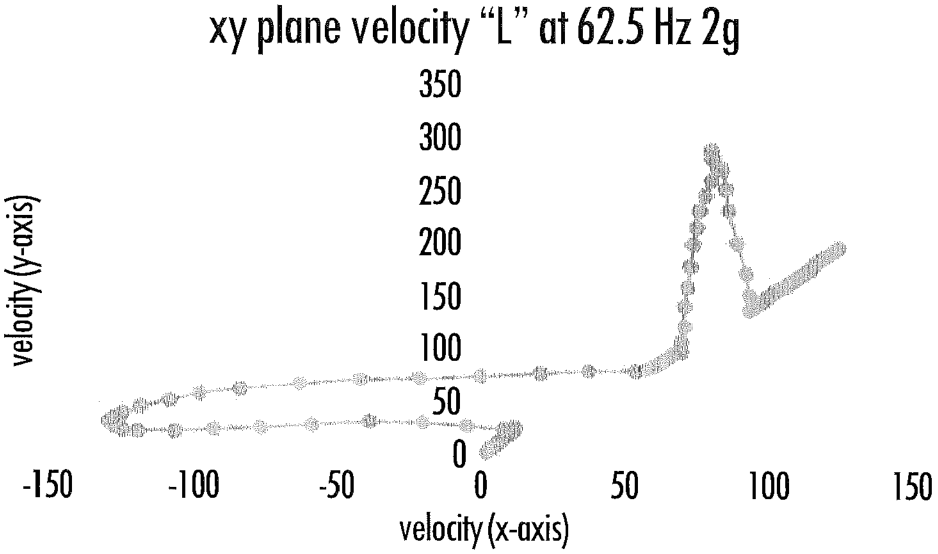
Figure 6:
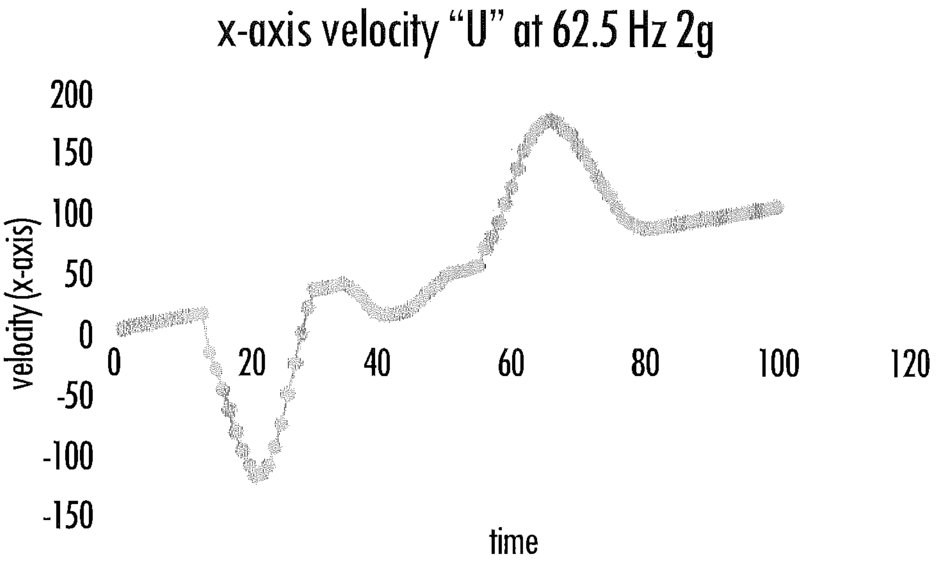
Figure 7:
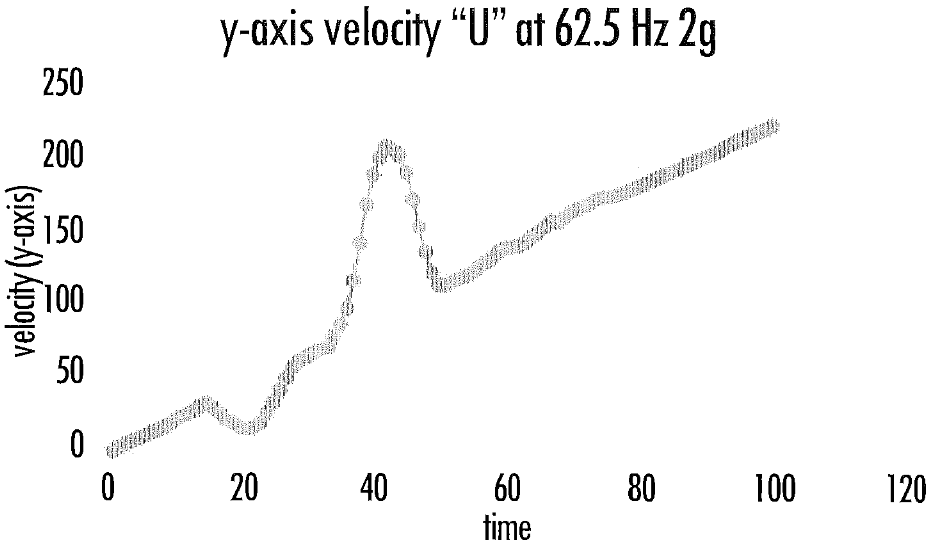

Having thus described the disclosure in the foregoing general terms, reference will now be made to the accompanying drawings, which are not necessarily drawn to scale, and wherein:

FIG. 1 is a partially cut-away view of an aerosol delivery device comprising a cartridge and a control body including a variety of elements that may be utilized in an aerosol delivery device according to various example implementations of the present disclosure;

FIG. 2 schematically illustrates a multi-axis accelerometer for use in an aerosol delivery device according to example implementations;

FIGS. 3, 4 and 5 are graphs of velocity and position versus time for a trace of an uppercase "L," and FIGS. 6 and 7 are graphs of velocity and position versus time for a trace of an uppercase "U" (both at sampling rates of 62.5 Hz with 2 g sensitivity); and FIG. 8 illustrates various operations in a method of controlling operation of an aerosol delivery device including a motion sensor within a housing thereof, and including a microprocessor, according to example implementations.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise.

As described hereinafter, example implementations of the present disclosure relate to aerosol delivery systems. Aerosol delivery systems according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery systems does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery systems of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

Aerosol delivery systems of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar. In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., a rechargeable battery and various electronics for controlling the operation of that article), and at the other end and removably attached thereto an outer body or shell containing a disposable portion (e.g., a disposable flavor-containing cartridge).

Aerosol delivery systems of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microprocessor, individually or as part of a microcontroller), a heater or heat generation member (e.g., an electrical resistance heating element or other component, which alone or in combination with one or more further elements may be commonly referred to as an "atomizer"), an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined airflow path through the article such that aerosol generated can be withdrawn therefrom upon draw).

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially available electronic aerosol delivery devices, such as those representative products referenced in background art section of the present disclosure.

In various examples, an aerosol delivery device can comprise a reservoir configured to retain the aerosol precursor composition. The reservoir particularly can be formed of a porous material (e.g., a fibrous material) and thus may be referred to as a porous substrate (e.g., a fibrous substrate).

A fibrous substrate useful as a reservoir in an aerosol delivery device can be a woven or nonwoven material formed of a plurality of fibers or filaments and can be formed of one or both of natural fibers and synthetic fibers. For example, a fibrous substrate may comprise a fiberglass material. In particular examples, a cellulose acetate material can be used. In other example implementations, a carbon material can be used. A reservoir may be substantially in the form of a container and may include a fibrous material included therein.

One example implementation of an aerosol delivery device 100 according to the present disclosure is provided in FIG. 1. As seen in the cut-away view illustrated therein, the aerosol delivery device can comprise a control body 102 and a cartridge 104 that can be permanently or detachably aligned in a functioning relationship. Engagement of the control body and the cartridge can be press fit (as illustrated), threaded, interference fit, magnetic or the like. In particular, connection components, such as further described herein may be used. For example, the control body may include a coupler that is adapted to engage a connector on the cartridge.

In specific example implementations, one or both of the control body 102 and the cartridge 104 may be referred to as being disposable or as being reusable. For example, the control body may have a replaceable battery or a rechargeable battery and thus may be combined with any type of recharging technology, including connection to a typical electrical outlet, connection to a car charger (i.e., cigarette lighter receptacle), and connection to a computer, such as through a universal serial bus (USB) cable. For example, an adaptor including a USB connector at one end and a control body connector at an opposing end is disclosed in U.S. Pat. App. Pub. No. 2014/0261495 to Novak et al., which is incorporated herein by reference in its entirety. Further, in some examples the cartridge may comprise a single-use cartridge, as disclosed in U.S. Pat. App. Pub. No. 2014/0060555 to Chang et al., which is incorporated herein by reference in its entirety.

As illustrated in FIG. 1, the control body 102 can be formed of a control body shell 106 that can include a control component 108 (e.g., a microprocessor, individually or as part of a microcontroller), a flow sensor 110, a battery 112 and a light-emitting diode (LED) 114, and such components can be variably aligned. Further indicators (e.g., a haptic feedback component, an audio feedback component, or the like) can be included in addition to or as an alternative to the LED. The cartridge 104 can be formed of a cartridge shell 116 enclosing a reservoir 118 that is in fluid communication with a liquid transport element 120 adapted to wick or otherwise transport an aerosol precursor composition stored in the reservoir housing to a heater 122 (sometimes referred to as a heating element). In some example, a valve may be positioned between the reservoir and heater, and configured to control an amount of aerosol precursor composition passed or delivered from the reservoir to the heater.

Various examples of materials configured to produce heat when electrical current is applied therethrough may be employed to form the heater 122. The heater in these examples may be resistive heating element such as a wire coil. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials (e.g., carbon-based foams and yarns) and ceramics (e.g., positive or negative temperature coefficient ceramics). Example implementations of heaters or heating members useful in aerosol delivery devices according to the present disclosure are further described below, and can be incorporated into devices such as illustrated in FIG. 1 as described herein.

An opening 124 may be present in the cartridge shell 116 (e.g., at the mouthend) to allow for egress of formed aerosol from the cartridge 104. Such components are representative of the components that may be present in a cartridge and are not intended to limit the scope of cartridge components that are encompassed by the present disclosure.

The cartridge 104 also may include one or more electronic components 126, which may include an integrated circuit, a memory component, a sensor, or the like. The electronic components may be adapted to communicate with the control component 108 and/or with an external device by wired or wireless means. The electronic components may be positioned anywhere within the cartridge or a base 128 thereof.

Although the control component 108 and the flow sensor 110 are illustrated separately, it is understood that the control component and the flow sensor may be combined as an electronic circuit board with the air flow sensor attached directly thereto. Further, the electronic circuit board may be positioned horizontally relative the illustration of FIG. 1 in that the electronic circuit board can be lengthwise parallel to the central axis of the control body. In some examples, the air flow sensor may comprise its own circuit board or other base element to which it can be attached. In some examples, a flexible circuit board may be utilized. A flexible circuit board may be configured into a variety of shapes, include substantially tubular shapes. In some examples, a flexible circuit board may be combined with, layered onto, or form part or all of a heater substrate as further described below.

The control body 102 and the cartridge 104 may include components adapted to facilitate a fluid engagement therebetween. As illustrated in FIG. 1, the control body can include a coupler 130 having a cavity 132 therein. The base 128 of the cartridge can be adapted to engage the coupler and can include a projection 134 adapted to fit within the cavity. Such engagement can facilitate a stable connection between the control body and the cartridge as well as establish an electrical connection between the battery 112 and control component 108 in the control body and the heater 122 in the cartridge. Further, the control body shell 106 can include an air intake 136, which may be a notch in the shell where it connects to the coupler that allows for passage of ambient air around the coupler and into the shell where it then passes through the cavity 132 of the coupler and into the cartridge through the projection 134.

A coupler and a base useful according to the present disclosure are described in U.S. Pat. App. Pub. No. 2014/0261495 to Novak et al., which is incorporated herein by reference in its entirety. For example, the coupler 130 as seen in FIG. 1 may define an outer periphery 138 configured to mate with an inner periphery 140 of the base 128. In one example the inner periphery of the base may define a radius that is substantially equal to, or slightly greater than, a radius of the outer periphery of the coupler. Further, the coupler may define one or more protrusions 142 at the outer periphery configured to engage one or more recesses 144 defined at the inner periphery of the base. However, various other examples of structures, shapes and components may be employed to couple the base to the coupler. In some examples the connection between the base of the cartridge 104 and the coupler of the control body 102 may be substantially permanent, whereas in other examples the connection therebetween may be releasable such that, for example, the control body may be reused with one or more additional cartridges that may be disposable and/or refillable.

The aerosol delivery device 100 may be substantially rod-like or substantially tubular shaped or substantially cylindrically shaped in some examples. In other examples, further shapes and dimensions are encompassed—e.g., a rectangular or triangular cross-section, multifaceted shapes, or the like.

The reservoir 118 illustrated in FIG. 1 can be a container or can be a fibrous reservoir, as presently described. For example, the reservoir can comprise one or more layers of nonwoven fibers substantially formed into the shape of a tube encircling the interior of the cartridge shell 116, in this example. An aerosol precursor composition can be retained in the reservoir. Liquid components, for example, can be sorptively retained by the reservoir. The reservoir can be in fluid connection with the liquid transport element 120. The liquid transport element can transport the aerosol precursor composition stored in the reservoir via capillary action to the heater 122 that is in the form of a metal wire coil in this example. As such, the heater is in a heating arrangement with the liquid transport element. Example implementations of reservoirs and transport elements useful in aerosol delivery devices according to the present disclosure are further described below, and such reservoirs and/or transport elements can be incorporated into devices such as illustrated in FIG. 1 as described herein. In particular, specific combinations of heating members and transport elements as further described below may be incorporated into devices such as illustrated in FIG. 1 as described herein.

In use, when a user draws on the aerosol delivery device 100, airflow is detected by the flow sensor 110, and the heater 122 is activated to vaporize the components for the aerosol precursor composition. Drawing upon the mouthend of the aerosol delivery device causes ambient air to enter the air intake 136 and pass through the cavity 132 in the coupler 130 and the central opening in the projection 134 of the base 128. In the cartridge 104, the drawn air combines with the formed vapor to form an aerosol. The aerosol is whisked, aspirated or otherwise drawn away from the heater and out the opening 124 in the mouthend of the aerosol delivery device.

In some examples, the aerosol delivery device 100 may include a number of additional software-controlled functions. For example, the aerosol delivery device may include a battery protection circuit configured to detect battery input, loads on the battery terminals, and charging input. The battery protection circuit may include short-circuit protection and under-voltage lock out. The aerosol delivery device may also include components for ambient temperature measurement, and its control component 108 may be configured to control at least one functional element to inhibit battery charging if the ambient temperature is below a certain temperature (e.g., 0° C.) or above a certain temperature (e.g., 45° C.) prior to start of charging or during charging.

Power delivery from the battery 112 may vary over the course of each puff on the device 100 according to a power control mechanism. The device may include a “long puff” safety timer such that in the event that a user or an inadvertent mechanism causes the device to attempt to puff continuously, the control component 108 may control at least one functional element to terminate the puff automatically after some period of time (e.g., four seconds). Further, the time between puffs on the device may be restricted to less than a period of time (e.g., 100). A watchdog safety timer may automatically reset the aerosol delivery device if its control component or software running on it becomes unstable and does not service the timer within an appropriate time interval (e.g., eight seconds). Further safety protection may be provided in the event of a defective or otherwise failed flow sensor 110, such as by permanently disabling the aerosol delivery device in order to prevent inadvertent heating. A puffing limit switch may deactivate the device in the event of a pressure sensor fail causing the device to continuously activate without stopping after the four second maximum puff time.

The aerosol delivery device 100 may include a puff tracking algorithm configured for heater lockout once a defined number of puffs has been achieved for an attached cartridge (based on the number of available puffs calculated in light of the e-liquid charge in the cartridge). The aerosol delivery device may include a sleep, standby or low-power mode function whereby power delivery may be automatically cut off after a defined period of non-use. Further safety protection may be provided in that all charge/discharge cycles of the battery 112 may be monitored by the control component 108 over its lifetime. After the battery has attained the equivalent of a predetermined number (e.g., 200) full discharge and full recharge cycles, it may be declared depleted, and the control component may control at least one functional element to prevent further charging of the battery.

The various components of an aerosol delivery device according to the present disclosure can be chosen from components described in the art and commercially available. Examples of batteries that can be used according to the disclosure are described in U.S. Pat. App. Pub. No. 2010/0028766 to Peckerar et al., which is incorporated herein by reference in its entirety.

The aerosol delivery device 100 can incorporate the sensor 110 or another sensor or detector for control of supply of electric power to the heater 122 when aerosol generation is desired (e.g., upon draw during use). As such, for example, there is provided a manner or method of turning off the power supply to the heater when the aerosol delivery device is not be drawn upon during use, and for turning on the power supply to actuate or trigger the generation of heat by the heater during draw. Additional representative types of sensing or detection mechanisms, structure and configuration thereof, components thereof, and general methods of operation thereof, are described in U.S. Pat. No. 5,261,424 to Sprinkel, Jr., U.S. Pat. No. 5,372,148 to McCafferty et al., and PCT Pat. App. Pub. No. WO 2010/003480 to Flick, all of which are incorporated herein by reference in their entireties.

The aerosol delivery device 100 most preferably incorporates the control component 108 or another control mechanism for controlling the amount of electric power to the heater 122 during draw. Representative types of electronic components, structure and configuration thereof, features thereof, and general methods of operation thereof, are described in U.S. Pat. No. 4,735,217 to Gerth et al., U.S. Pat. No. 4,947,874 to Brooks et al., U.S. Pat. No. 5,372,148 to McCafferty et al., U.S. Pat. No. 6,040,560 to Fleischhauer et al., U.S. Pat. No. 7,040,314 to Nguyen et al., U.S. Pat. No. 8,205,622 to Pan, U.S. Pat. App. Pub. No. 2009/0230117 to Fernando et al., U.S. Pat. App. Pub. No. 2014/0060554 to Collet et al., U.S. Pat. App. Pub. No. 2014/0270727 to Ampolini et al., and U.S. patent application Ser. No. 14/209, 191 to Henry et al., filed Mar. 13, 2014, all of which are incorporated herein by reference in their entireties.

Representative types of substrates, reservoirs or other components for supporting the aerosol precursor are described in U.S. Pat. No. 8,528,569 to Newton, U.S. Pat. App. Pub. No. 2014/0261487 to Chapman et al., U.S. patent application Ser. No. 14/011,992 to Davis et al., filed Aug. 28, 2013, and U.S. patent application Ser. No. 14/170,838 to Bless et al., filed Feb. 3, 2014, all of which are incorporated herein by reference in their entireties. Additionally, various wicking materials, and the configuration and operation of those wicking materials within certain types of electronic cigarettes, are set forth in U.S. Pat. App. Pub. No. 2014/0209105 to Sears et al., which is incorporated herein by reference in its entirety.

The aerosol precursor composition, also referred to as a vapor precursor composition, may comprise a variety of components including, by way of example, a polyhydric alcohol (e.g., glycerin, propylene glycol or a mixture thereof), nicotine, tobacco, tobacco extract and/or flavorants. Various components that may be included in the aerosol precursor composition are described in U.S. Pat. No. 7,726,320 to Robinson et al., which is incorporated herein by reference in its entirety. Additional representative types of aerosol precursor compositions are set forth in U.S. Pat. No. 4,793,365 to Sensabaugh, Jr. et al., U.S. Pat. No. 5,101,839 to Jakob et al., U.S. Pat. No. 6,779,531 to Biggs et al., U.S. Pat. App. Pub. No. 2013/0008457 to Zheng et al., and *Chemical and Biological Studies on New Cigarette Prototypes that Heat Instead of Burn Tobacco,* R. J. Reynolds Tobacco Company Monograph (1988), all of which are incorporated herein by reference in their entireties.

Additional representative types of components that yield visual cues or indicators may be employed in the aerosol delivery device 100, such as LEDs and related components, vibratory elements and the like. Examples of suitable LED components, and the configurations and uses thereof, are described in U.S. Pat. No. 5,154,192 to Sprinkel et al., U.S. Pat. No. 8,499,766 to Newton, U.S. Pat. No. 8,539,959 to Scatterday, and U.S. patent application Ser. No. 14/173,266 to Sears et al., filed Feb. 5, 2014, all of which are incorporated herein by reference in their entireties.

Yet other features, controls or components that can be incorporated into aerosol delivery devices of the present disclosure are described in U.S. Pat. No. 5,967,148 to Harris et al., U.S. Pat. No. 5,934,289 to Watkins et al., U.S. Pat. No. 5,954,979 to Counts et al., U.S. Pat. No. 6,040,560 to Fleischhauer et al., U.S. Pat. No. 8,365,742 to Hon, U.S. Pat. No. 8,402,976 to Fernando et al., U.S. Pat. App. Pub. No. 2010/0163063 to Fernando et al., U.S. Pat. App. Pub. No. 2013/0192623 to Tucker et al., U.S. Pat. App. Pub. No. 2013/0298905 to Leven et al., U.S. Pat. App. Pub. No. 2013/0180553 to Kim et al., U.S. Pat. App. Pub. No. 2014/0000638 to Sebastian et al., U.S. Pat. App. Pub. No. 2014/0261495 to Novak et al., and U.S. Pat. App. Pub. No. 2014/0261408 to DePiano et al., all of which are incorporated herein by reference in their entireties.

In some further examples, the aerosol delivery device 100 may be a gesture-enabled device such that through one or more gestures, a user may control operation of the device or receive information from the device. Gesture-enabling the aerosol delivery device may enhance the user experience in many ways such as through advanced user unlock features, customized gesture control of the aerosol delivery device, along with pre-programmed functionalities. Examples of suitable gestures include single or multiple taps on the housing, tilting the device, shaking (e.g., directional shaking) the device, or tracing a character with the housing.

In a more particular example, on first use, the aerosol delivery device may be configured with an "unlock code" to lock/unlock the device, such as by the user tracing a particular character (e.g., lowercase "l") with the device. The trace of a distinct particular character (e.g., lowercase "b") may cause the aerosol delivery device to indicate a charge-level of its battery 112, such as via a sensory feedback member (e.g., a LED or a vibratory element) of the device. In another example, the trace of a particular character may cause the aerosol delivery device to indicate a level of the aerosol precursor composition retained in its reservoir 118. In these and other examples, a character may refer to any suitable sign or symbol such as, for example, any letter, number or other shape (e.g., geometric shape).

In some examples, the aerosol delivery device 100 may be connected to a software application running on a computing device such as a mobile computer (e.g., smartphone, tablet). In these examples, a gesture such as an "up-down" motion of the device may cause it to send information such as charge-level and/or aerosol precursor composition level to the mobile application for display to the user. In another example, a gesture such as a vertical shaking of the aerosol delivery device may indicate to the software application that the aerosol precursor composition level is low, which may cause the mobile application to automatically search for and display one or more locations where the user can purchase additional aerosol precursor composition.

In other examples, gesture-enabling the aerosol delivery device 100 may improve battery life by enabling the device to go into a deep sleep mode, from which the aerosol delivery device may be awoken in response to a gesture such as the device being shaken. With additional features added, battery life may also be improved through gesture-only activation. For instance, in an instance in which the aerosol delivery device includes a sensory feedback member for indicating the level of aerosol precursor composition but only in response to a particular gesture, the sensory feedback member need not be actuated on every use of the aerosol delivery device.

These and other gestures may be preset or user-defined. In some examples, the aerosol delivery device may enable the user to define gestures for various operations, and in a particular example, define a gesture for the unlock code. This may be accomplished in a number of different manners, such as through direct interaction with the aerosol delivery device, or interaction with the aforementioned or another software application.

Additional indications could be added to the aerosol delivery device 100 based on its being gesture-enabled, not just those based on user experience. These indications could be used for statistics and marketing as well as user experience notes. For example, the aerosol delivery device may detect and log the time between when a user first picks up the aerosol delivery device to when they have the first use of the day. The aerosol delivery device may detect and log the number of times a user checks battery/aerosol precursor composition levels each day. In coordination with the software application, the aerosol delivery device may detect instances in which the user unsuccessfully sought out additional aerosol precursor composition, such as in instances in which the user's location is outside a given range of the closest retailer. In another example, the aerosol delivery device may detect and log the number of times an incorrect unlock code is attempted, which in some examples may be used to indicate to the user that an unauthorized person has attempted to unlock or use the aerosol delivery device.

The aerosol delivery device may be gesture enabled in any of a number of different manners. Returning to FIG. 1, in some examples, the aerosol delivery device 100 may include a motion sensor 146 configured to detect a defined motion of the aerosol delivery device caused by user interaction with the housing to perform a gesture. The motion sensor may be any of a number of sensors that may be configured to detect the defined motion, convert the defined motion to an electrical signal and output the electrical signal. Examples of suitable motion sensors include single or combinations of tilt sensors, single or multi-axis accelerometers, gyroscopes and the like, any one or more of which may be constructed using microelectromechanical systems-based (MEMS) techniques.

Tilt sensors may be used for specific movement detection, and are often used in conjunction with accelerometers to generate more complex data. Accelerometers operate based on acceleration sensing in the unit, including acceleration related due to gravity; and for this reason, accelerometers are often used for tilt detection. Accelerometers are often used with tilt sensors or gyroscopes to provide a full movement breakdown. Gyroscopes may be capable of detecting rotational changes in position (roll, pitch and yaw), and are often used in combination with accelerometers for increased flexibility. Other types of motion detectors may also be suitable for example implementations, either alone or in combination with the aforementioned. One example of another suitable sensor that has more recently been developed is powered through external radio waves, and may be capable of detecting movement without the sensor-equipped device in hand.

The motion sensor 146 may be located within a housing of the aerosol delivery device 100, such as the housing of the control body 102 or cartridge 104, or a single housing comprising control components and cartridge components. The motion sensor may be configured to detect a defined motion of the aerosol delivery device caused by user interaction with the housing to perform a gesture, which may be recognized by the control component 108 (e.g., microprocessor) or motion sensor itself to perform an associated operation.

The control component 108 (e.g., microprocessor) of the aerosol delivery device 100 may be configured to receive the electrical signal from the motion sensor, recognize the gesture and an operation associated with the gesture based on the electrical signal, and control at least one functional element of the aerosol delivery device to perform the operation. In some examples, the electrical signal conveys data about the defined motion of the aerosol delivery device. In these examples, the control component being configured to recognize the gesture includes being configured to recognize a pattern in the data, the pattern being associated with the gesture. And in some further examples, the pattern is one of a plurality of patterns associated with a respective plurality of gestures associated with a respective plurality of operations.

In some examples, the motion sensor 146 may itself include logic sufficient to recognize one or more gesture and perform or cause performance of respective one or more associated operations. This may be the case, for example, for a gesture (e.g., double tap) intended to enter the device into an operational mode from a low-power mode, whereby the motion sensor may recognize the gesture and cause the control component 108 to wake and enter its operational mode. It should be understood, however, that the motion sensor may be equally configured to recognize other gestures and perform or cause performance of other associated operations, including at least some of those attributed to the control component as described herein.

To further illustrate aspects of gesture recognition suitable for aspects of the present disclosure, FIG. 2 illustrates a multi-axis accelerometer 200 that in some examples may correspond to the motion sensor. As shown, the accelerometer includes a number of vector components and axial orientation. The electrical signal from the accelerometer may convey data about its motion (and that of an aerosol delivery device 100 equipped with the accelerometer). FIGS. 3, 4 and 5 are graphs of velocity and position versus time for a trace of an uppercase “L,” and FIGS. 6 and 7 are graphs of velocity and position versus time for a trace of an uppercase “U” (both at sampling rates of 62.5 Hz with 2 g sensitivity).

By referencing the orientation of the accelerometer in FIG. 2, it may be possible to visualize movement of an equipped aerosol delivery device 100 from the −x direction to the +y direction for the “L.” Note that velocity may decrease as a change in direction is approached in all shapes (e.g., there is a corner). For the “U” movement, the aerosol delivery device may start moving in the −x direction, then move in the +y direction and onto the −x direction.

Returning to FIG. 1, in some examples, the aerosol delivery device 100 may also include a wired or wireless (e.g., Bluetooth) communication interface 148 via which the device may be connected to a software application on a computing device such as a mobile computer. In these examples, one or more gestures may cause certain interactions between the aerosol delivery device and software application such as through the transfer of information or indication (e.g., low aerosol precursor composition) from the aerosol delivery device to the software application, and cause the software application to perform one or more actions with that information or indication, as described above. In other examples, one or more gestures may control the state of the connection of the device to the software application (e.g., pair/unpair, connect/disconnect).

In some examples, the gesture may be user-defined. In these examples, before the control component 108 (e.g., microprocessor) is configured to recognize the gesture, the control component may be configured to receive user selection of the operation and learn to recognize the gesture with which the operation is associated based on training data conveyed by another electrical signal from the motion sensor, the other electrical signal being converted from a training motion that is the same as or substantially similar to the defined motion. This may be accomplished in a number of different manners, such as through direct interaction with the aerosol delivery device, or interaction with the aforementioned or another software application on the same or another computing device via the communication interface 148.

As described above, recognizable gestures may be associated with any of a number of operations that may be performed by at least one functional element of the aerosol delivery device 100. For example, the operation may include altering a power state of the aerosol delivery device, or altering a locked state of the aerosol delivery device. In another example, a sensory-feedback member may be controlled to provide an indication of a charge-level of a battery configured to supply power to the aerosol delivery device. And in yet another example, a sensory-feedback member may be controlled to provide an indication of a level of an aerosol precursor composition retained in a reservoir of the aerosol delivery device.

Returning again to FIG. 1, the electrical signal output from the flow sensor 110 can be used by one or more control elements of the aerosol delivery device to control the operation of the device. Such operation can encompass a variety of functional elements of the device, such as the heater 122, a fluid-delivery member, a sensory-feedback member and the like.

For example, the electrical signal from the flow sensor 110 can be used by a control component 108 (e.g., microprocessor) to control opening and closing of a valve between the reservoir 118 and heater 122. For example, as the draw on the device 100 increases and the electrical signal output by the sensor correspondingly changes, the opening of the valve can be increased to allow for a greater volume of aerosol precursor composition to pass from the reservoir to heater. In some examples in which a sensory feedback member (e.g., a LED or a vibratory element) is used, an increased draw on the device can signal the control component to cause a different lighting pattern by the LED or cause a different vibration pattern by the vibratory element.

In some examples, the electrical signal output from the flow sensor 110 can be coupled with control electronics of the device 100 to alter the profile of a heating element in the device, such as the heater 122. In particular, the heating profile can be caused to change in real time relative to the airflow rate caused by the magnitude of the draw on the device.

FIG. 8 illustrates various operations in a method 800 for controlling operation of an aerosol delivery device including a motion sensor (e.g., tilt sensor, MEMS-based accelerometer and/or MEMS-based gyroscope) and a control component such as a microprocessor. As shown at block 802, the method may include detecting with the motion sensor, a defined motion of the aerosol delivery device caused by user interaction with the housing to perform a gesture, with the motion sensor converting the defined motion to an electrical signal. In some examples, the defined motion may be caused by user interaction to trace a character (e.g., alphabetic character, numeric character) with the housing.

As shown at block 804, the method may include recognizing with the control component (e.g., microprocessor) or motion sensor, the gesture and an operation associated with the gesture based on the electrical signal. The electrical signal may convey data about the defined motion of the aerosol delivery device. In some examples, recognizing the gesture may include recognizing a pattern in the data, with the pattern being associated with the gesture. And in some further examples, the pattern may be one of a plurality of patterns associated with a respective plurality of gestures associated with a respective plurality of operations.

In some examples, the gesture may be user-defined. In these examples, the control component (e.g., microprocessor) may recognize the gesture, and beforehand, the method may further include receiving user selection of the operation at the control component. And with the control component, the method may include learning to recognize the gesture with which the operation is associated based on training data conveyed by another electrical signal from the motion sensor, the other electrical signal being converted from a training motion that is the same as or substantially similar to the defined motion.

Returning to FIG. 8, the method may include controlling at least one functional element of the aerosol delivery device to perform the operation, as shown at block 806. In some examples, the operation may be altering a power state of the aerosol delivery device (e.g., turn on/off, enter standby/low-power mode, enter operational mode), or altering a locked state of the aerosol delivery device (locked/unlocked). In some examples, controlling the functional element(s) includes controlling a sensory-feedback member to provide an indication of a charge-level of a battery configured to supply power to the aerosol delivery device. And in some examples, controlling the functional element(s) includes controlling a sensory-feedback member to provide an indication of a level of aerosol precursor composition retained in a reservoir of the aerosol delivery device.

The foregoing description of use of the article can be applied to the various example implementations described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article illustrated in FIG. 1 or as otherwise described above may be included in an aerosol delivery device according to the present disclosure.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An aerosol delivery device comprising:

a housing;

a microprocessor; and a motion sensor within the housing and configured to detect a defined motion of the aerosol delivery device caused by user interaction to trace a character with the housing and thereby perform a gesture, the motion sensor being configured to convert the defined motion to an electrical signal that conveys data about the defined motion of the aerosol delivery device, the data including samples of velocity of the aerosol delivery device, or data from which the samples of velocity are determinable, wherein the microprocessor is configured to receive the electrical signal, recognize the character and thereby the gesture, and an operation associated with the gesture, based on the electrical signal, and control at least one functional element of the aerosol delivery device to perform the operation, the microprocessor being configured to recognize the character including the microprocessor being configured to recognize a pattern in the samples of velocity, the pattern being associated with the character and thereby the gesture, the character and thereby the gesture being user-defined for the operation comprising altering a locked state of the aerosol delivery device.

2. The aerosol delivery device of claim 1, wherein the motion sensor includes a tilt sensor, microelectromechanical systems-based (MEMS-based) accelerometer, MEMS -based gyroscope or a combination of one or more thereof.

3. The aerosol delivery device of claim 1, wherein the pattern is one of a plurality of patterns associated with a respective plurality of gestures associated with a respective plurality of operations.

4. The aerosol delivery device of claim 1, wherein the microprocessor is configured to recognize the gesture, wherein before the microprocessor is configured to recognize the gesture, the microprocessor is configured to receive user selection of the operation and learn to recognize the gesture with which the operation is associated based on training data conveyed by another electrical signal from the motion sensor, the other electrical signal being converted from a training motion that is the same as or substantially similar to the defined motion.

5. The aerosol delivery device of claim 1, wherein the pattern is one of a plurality of patterns associated with a respective plurality of gestures associated with a respective plurality of operations that also comprises altering a power state of the aerosol delivery device.

6. The aerosol delivery device of claim 1 further comprising a battery configured to supply power to the aerosol delivery device, wherein the pattern is one of a plurality of patterns associated with a respective plurality of gestures associated with a respective plurality of operations, wherein the microprocessor is further configured to control at least one functional element of the aerosol delivery device to perform another operation of the respective plurality of operations, including the microprocessor being configured to control a sensory-feedback member to provide an indication of a charge-level of the battery.

7. The aerosol delivery device of claim 1 further comprising a reservoir configured to retain an aerosol precursor composition therein, wherein the pattern is one of a plurality of patterns associated with a respective plurality of gestures associated with a respective plurality of operations, and wherein the microprocessor is further configured to control at least one functional element of the aerosol delivery device to perform another operation of the respective plurality of operations, including the microprocessor being configured to control a sensory-feedback member to provide an indication of a level of the aerosol precursor composition retained in the reservoir.

8. A method of controlling operation of an aerosol delivery device including a motion sensor within a housing thereof, and including a microprocessor, the method comprising:

detecting with the motion sensor, a defined motion of the aerosol delivery device caused by user interaction to trace a character with the housing and thereby perform a gesture, the motion sensor converting the defined motion to an electrical signal that conveys data about the defined motion of the aerosol delivery device, the data including samples of velocity of the aerosol delivery device, or data from which the samples of velocity are determinable;

recognizing with the microprocessor or motion sensor, the character and thereby the gesture, and an operation associated with the gesture, based on the electrical signal, recognizing the character including recognizing a pattern in the samples of velocity, the pattern being associated with the character and thereby the gesture, the character and thereby the gesture being user-defined for the operation comprising altering a locked state of the aerosol delivery device; and controlling at least one functional element of the aerosol delivery device to perform the operation.

9. The method of claim 8, wherein the motion sensor includes a tilt sensor, microelectromechanical systems-based (MEMS-based) accelerometer, MEMS-based gyroscope or a combination of one or more thereof.

10. The method of claim 8, wherein the pattern is one of a plurality of patterns associated with a respective plurality of gestures associated with a respective plurality of operations.

11. The method of claim 8, wherein the gesture is recognized by the microprocessor, and before the microprocessor recognizes the gesture, the method further comprises:

receiving user selection of the operation at the microprocessor; and with the microprocessor, learning to recognize the gesture with which the operation is associated based on training data conveyed by another electrical signal from the motion sensor, the other electrical signal being converted from a training motion that is the same as or substantially similar to the defined motion.

12. The method of claim 8, wherein the pattern is one of a plurality of patterns associated with a respective plurality of gestures associated with a respective plurality of operations that also comprises altering a power state of the aerosol delivery device.

13. The method of claim 8, wherein the aerosol delivery device further includes a battery configured to supply power to the aerosol delivery device, wherein the pattern is one of a plurality of patterns associated with a respective plurality of gestures associated with a respective plurality of operations, and wherein the method further comprises controlling at least one functional element of the aerosol delivery device to perform another operation of the respective plurality of operations, including controlling a sensory-feedback member to provide an indication of a charge-level of the battery.

14. The method of claim 8, wherein the aerosol delivery device further includes a reservoir configured to retain an aerosol precursor composition therein, wherein the pattern is one of a plurality of patterns associated with a respective plurality of gestures associated with a respective plurality of operations, and wherein the method further comprises controlling at least one functional element of the aerosol delivery device to perform another operation of the respective plurality of operations, including controlling a sensory-feedback member to provide an indication of a level of the aerosol precursor composition retained in the reservoir.

15. The aerosol delivery device of claim 1, wherein the samples of velocity are samples of linear velocity of the aerosol delivery device in each of a plurality of directions.

16. The aerosol delivery device of claim 1, wherein the character and thereby the gesture is an unlock code to lock or unlock the aerosol delivery device, and wherein the microprocessor is further configured to detect and log a number of times an incorrect unlock code is attempted.

17. The aerosol delivery device of claim 1 further comprising:

a communication interface to enable the aerosol delivery device to connect to a software application on a computing device, wherein the pattern is one of a plurality of patterns associated with a respective plurality of gestures associated with a respective plurality of operations, and the respective plurality of gestures include another gesture that causes an interaction between the aerosol delivery device and the software application.

18. The aerosol delivery device of claim 17, wherein the character and thereby the gesture is an unlock code to lock or unlock the aerosol delivery device, wherein the microprocessor is further configured to detect and log a number of times an incorrect unlock code is attempted, and wherein the other gesture of the respective plurality of gestures causes the interaction through a transfer of an indication of the number of times the incorrect code is attempted, from the aerosol delivery device to the software application.

19. The method of claim 8, wherein the samples of velocity are samples of linear velocity of the aerosol delivery device in each of a plurality of directions.

20. The method of claim 8, wherein the character and thereby the gesture is an unlock code to lock or unlock the aerosol delivery device, and wherein the method further comprises detecting and logging a number of times an incorrect unlock code is attempted.

21. The method of claim 8 further comprising:

connecting the aerosol delivery device to a software application on a computing device, wherein the pattern is one of a plurality of patterns associated with a respective plurality of gestures associated with a respective plurality of operations, and the respective plurality of gestures include another gesture that causes an interaction between the aerosol delivery device and the software application.

22. The method of claim 21, wherein the character and thereby the gesture is an unlock code to lock or unlock the aerosol delivery device, wherein the method further comprises detecting and logging a number of times an incorrect unlock code is attempted, and wherein the other gesture of the respective plurality of gestures causes the interaction through a transfer of an indication of the number of times the incorrect code is attempted, from the aerosol delivery device to the software application.

* * * * *